United States Patent [19]
van den Abeele et al.

[11] Patent Number: 5,987,775
[45] Date of Patent: Nov. 23, 1999

[54] METHOD AND APPARATUS FOR SIZE REDUCTION OF WET GLUTEN

[75] Inventors: Theo van den Abeele, Oosterhout, Netherlands; Ernesto R. Kilian Gonzalez, Mexico City, Mexico

[73] Assignee: Cargill B.V., Bergen Op Zoom, Netherlands

[21] Appl. No.: 08/950,041

[22] Filed: Oct. 14, 1997

[30] Foreign Application Priority Data

Oct. 16, 1996 [NL] Netherlands ............ 1004292

[51] Int. Cl.$^6$ .................... P26B 5/06
[52] U.S. Cl. ................ 34/291; 34/301
[58] Field of Search .......... 34/284, 285, 301, 34/92, 291; 426/471, 524, 549, 653, 656; 99/468, 483

[56] References Cited

U.S. PATENT DOCUMENTS

| | | |
|---|---|---|
| 3,614,001 | 10/1971 | Beike . |
| 4,075,369 | 2/1978 | Ferraro et al. ............ 427/185 |
| 4,102,503 | 7/1978 | Meinass . |
| 4,177,574 | 12/1979 | Kobayashi et al. .......... 34/385 |
| 4,396,637 | 8/1983 | Singer ................... 426/549 |
| 4,520,574 | 6/1985 | Sugisawa et al. .......... 34/289 |
| 5,246,724 | 9/1993 | Mathieu et al. ........... 426/549 |

FOREIGN PATENT DOCUMENTS

| | | | |
|---|---|---|---|
| 28 12 122 | 10/1979 | Germany | ............ F26B 3/12 |
| 30 11 377 A1 | 10/1981 | Germany | ............ F26B 3/12 |
| 0750944 | 1/1997 | Germany . | |
| 0600701 | 6/1994 | United Kingdom . | |

OTHER PUBLICATIONS

*Baking & Snack*, 1993, pp. 24–26, XP000672626, C.E. Stauffer, "Vital Wheat Gluten".

*Voedingsmiddlentechnologie*, part 19, Nov. 23, 1986, pp. 24–30 XP002031625, Feys and Arnaut, "Tarwe–eiwit: Traditionele toepassing en toekomstige mogelijkheden" (with English summary on first page.)

International Search Report, dated May 27, 1997, for NL 1004292 (4 pages, with English translation).

European Search Report, Feb. 26, 1998, for EP 97 20 3172, 4 pages.

*Primary Examiner*—Henry Bennett
*Assistant Examiner*—Steve Gravini
*Attorney, Agent, or Firm*—Fitch, Even, Tabin & Flannery

[57] ABSTRACT

Acording to the invention, the size reduction of a wet mass of vital gluten is carried out while said mass is in a brittle state, as a result of which, on the one hand, the vitality is preserved and, on the other hand, savings in energy for the subsequent drying process are achieved. Said brittle state can be achieved by the mass being cooled to a temperature of −75° C. or less. Also described is an apparatus for implementing such a method, and a combination thereof with a drier.

16 Claims, No Drawings

METHOD AND APPARATUS FOR SIZE REDUCTION OF WET GLUTEN

TECHNICAL FIELD

The invention relates to a method for size reduction of a wet mass of vital gluten.

BACKGROUND OF THE INVENTION

Such a method is known in the art and is employed in the grain industry. This involves, for example, wheat being ground and thus being separated and washed, followed by the gluten fraction being separated from the starch fraction. The wet gluten mass is washed and compressed in preparation for the subsequent drying process, to obtain the desired dry gluten particles. Gluten is the general term for the proteins which are present in grain products, for example wheat. Gluten are added, for example, to bakery products, to cause them to rise. This characteristic is referred to by the term "vitality". It is the result of gluten having an elastic structure which can be expanded, for example by means of air or gas. In the wet state the vitality can be determined on the basis of the extent to which the gluten can be stretched without breaking under standardized conditions.

Vital gluten are separated from the starch in completely hydrated form. This form comprises fairly large balls—somewhat comparable to chewing gum—which need to be formed into a fine powder during drying. It is known in the art that the vitality is adversely affected by the mechanical shear forces, required for size reduction of the mass, and the drying temperature. So as not to impair the vitality of the wet gluten mass, the drying processes employed in practice need to be carried out gently. Indeed, existing drying systems are based on expansion-drying (flash-drying) at low temperature to minimize the effect of the temperature and to limit the residence time. In the process, the heat required for drying is abstracted from the product itself, so that the product is not exposed to a detrimental high temperature. Such drying, however, requires (very) small particles which can readily be dispersed in a stream of hot air in the drier. The small particles required are produced according to the prior art by the wet gluten mass first being made into a thin sheet (for example by extrusion through a slot-like orifice) or small granules and these then being fed into a hot airstream which is already transporting a large quantity of semidried and semipowdered vital gluten which are circulated in a drier which is provided with a disintegrator and within which the wet gluten, either in the form of a thin sheet or as granules, are converted into even smaller particles. The circulating, partly ground and partly dried particles are deposited on particles "freshly" introduced into the drier and thus form a layer thereon which ensures that the freshly introduced gluten will not, as a result of the moisture present therein, adhere to the walls and the like of the drier. A mixture thus formed passes through the drier and arrives at a classifying device, in which the finer and drier particles are separated from the coarser and wetter particles in the airstream. Finally, the separated gluten particles are subjected to a final filtering operation, in which the air is discharged to the atmosphere. As will be clear from the above, the remainder of the particles is returned to the drier feed.

SUMMARY OF THE INVENTION

Because of the cohesion of wet gluten, a great deal of energy is required within the disintegrator, firstly to extrude the mass to form a sheet or granule having a thickness of less than 5 mm (otherwise no effective processing is possible), in addition to which even more energy is required for pulverizing and conditioning the gluten mass in the disintegrator, so that it can be dried effectively and carefully in the evaporator.

It is an object of the present invention to provide a method and apparatus for the size reduction of a wet mass of vital gluten, which involves a reduced demand for mechanical energy.

A further object of the invention is to provide such a method and apparatus which result in the preservation of the vitality of the gluten particles.

Another object of the invention is to provide such a method and apparatus which result in more efficient and more rapid drying being possible of a product obtained thereby.

The method according to the invention is characterized in that the wet gluten mass is reduced in size while being in a brittle state.

Converting the wet gluten mass into a brittle state ensures that the brittle gluten can readily be reduced to the particle size desired for drying. The size reduction of gluten in this state itself requires less force, which is beneficial to the vitality. On the other hand it is thus possible to obtain a finer powder than has been possible hitherto, so that as a result of the finer particles the drying operation can be carried out more effectively and rapidly, which likewise has a positive effect on the vitality.

Preferably, the wet gluten mass is brought to the brittle state by the mass being cooled to a temperature of −75° C. or less. Upon cooling the water present in the mass freezes, and the mass forms a stiff, brittle solid which can readily be reduced in size and pulverized, for example by means of an impact process. Cooled air, $CO_2$ and $N_2$, for example, can be used as cooling media.

Prior to cooling the wet gluten mass is preferably formed into sheets having a maximum thickness of about 0.35 cm. In an other embodiment of the method according to the invention the mass is advantageously formed into granules of 1–10 mm prior to cooling. Subsequently the sheets or granules thus obtained are subjected to a size reduction operation.

The frozen gluten particles thus obtained, which still contain water, can then be dried in a conventional manner. While the wet gluten mass freezes, ice crystals may be formed on its surface. During the size reduction these ice crystals, if any, become detached from said surface, whereafter these loose ice crystals can advantageously be separated from the frozen gluten particles, the amount of water to be evaporated in the drying process being reduced as a result, thus entailing supplementary energy savings in the drying operation.

The invention also relates to an apparatus for the size reduction of a wet mass of vital gluten, said apparatus comprising a size reduction system. According to the invention the system is provided with cooling means for cooling the wet gluten mass to a brittle state.

Examples of suitable cooling means are, inter alia, a freezing system with cooled air, a freezing system with cooled plates, a cryogenic freezing system or a combination thereof. If required, means may be provided which, even before cooling, achieve a certain reduction in size of the large gluten balls, so that the cooling process can be carried out more effectively.

The size reduction apparatus itself may be of any customary type, for example mechanical, pneumatic or a combination thereof. A hammer mill, if required in combination with an upstream coarse crusher such as corrugated rolls, can be used.

Advantageously the apparatus also comprises separation means for separating ice crystals from the gluten particles, said means being positioned downstream of the size reduction apparatus. The separation means used may be, inter alia, screens where separation takes place on the basis of differences in size, or classifying systems where separation takes place on the basis of a difference in mass.

Advantageously, the discharge arrangement of the apparatus is designed in such a way that the free-flowing character of the particles is preserved. This facilitates input into the following drier.

The invention also relates to an installation for grinding and drying a wet gluten mass, which comprises a grinding apparatus according to the invention and a drier.

In the drier itself, its walls are preferably lined with a water-repellent lining, to prevent the pulverized, frozen gluten particles from adhering to the walls of the drier upon melting of the ice still present therein, prior to evaporation in the drier.

EXAMPLES

Hereinafter the method according to the invention is illustrated in more detail by way of examples.

Example 1

Wheat gluten containing approximately 30% by weight of dry solids were prepared into sheets having varying thickness by placing the gluten in a die consisting of two metal plates spaced apart by means of spacers, followed by subsequent freezing. The thicknesses tested were 1.8, 0.7 and 0.35 cm respectively. Only the sheet having a thickness of 0.35 cm became sufficiently brittle upon freezing.

It was not possible to roll a ball of gluten into a thin sheet, because the gluten was too elastic.

From an other experiment comprising rolling wheat gluten, which was only slightly below the freezing temperature, it also appeared that rolling was impossible. The gluten were either hard and frozen either soft and elastic. An intermediate zone did not appear, although it was observed in one sheet that both states existed adjacent to each other.

The freezing process was carried out in a freezer, which was supplied with liquid nitrogen. The minimum temperature which could be attained with this type of freezer was −120° C. The brittleness was tested by hitting the frozen gluten sheets with a hammer. When the gluten is brittle, less energy for size reduction is required. The resulting pieces were sharp.

A sheet of brittle gluten was easily to remove from the die. It sounded brittle (like some glass panels).

Example 2

Sheets of gluten having a thickness of 0.35 cm were frozen to −50°, −75° and −100° C. respectively. A period of time of approximately 20 minutes was sufficient to allow the gluten attaining this temperature. The results indicated that at a temperature of −50° C. the gluten were insufficiently brittle, while at a temperature of −75° C. the results were fair. The best results were obtained at −100° C.

During freezing no ice crystals were separated at the surface of the gluten. The vitality was maintained at all temperatures tested.

Example 3

Vital wheat gluten were frozen into granules (about 1–10 mm) in a freezer of the so-called mixing type ("cryodrop") at −70° C. and −90° C. respectively. The granules thus obtained were stored at −30° C. for several days. Thereafter the granules were ground in a mill having mill plates. Each plate was about 200 mm in diameter and provided with "teeth". One plate was rotated at 3000 rpm, which plate had a temperature of about +20° C. The stationary plate was cooled to about −10° C.

The result was that the gluten granules were easily reduced to about 1–2 mm. No loss of vitality was observed.

What is claimed is:

1. A method of reducing a moist gluten mass into gluten particles comprising:

freezing the moist gluten mass into a brittle moist mass;

subjecting the brittle moist mass to mechanical force to generate moist gluten particles; and drying the moist gluten particles.

2. A method as defined in claim 1, wherein the moist gluten mass is frozen into a brittle moist mass at about −50° C. or less.

3. A method as defined in claim 1, wherein ice crystals are formed upon freezing of the moist gluten mass.

4. A method as defined in claim 3, wherein after freezing and after the formation of the moist gluten particles the ice crystals are separated from the moist gluten particles.

5. A method as defined in claim 2, wherein the moist gluten mass is formed into sheets having a thickness of about 0.35 cm or less prior to freezing.

6. A method as defined in claim 2, wherein the moist gluten mass is formed into granules having a size of from about 1 to about 10 mm prior to freezing.

7. A method as defined in claim 1, wherein the moist gluten mass has a moisture content of about 70%.

8. A method of reducing a moist gluten mass into gluten particles comprising:

freezing the moist gluten mass into a brittle moist mass which includes ice crystals;

subjecting the brittle moist mass to mechanical force effective for generating moist gluten particles which include the ice crystals detached from the moist gluten particles;

separating the ice crystals from the moist gluten particles; and drying the moist gluten particles.

9. A method as defined in claim 8, wherein the moist gluten mass is frozen into a brittle moist mass at about −50° C. or less.

10. A method as defined in claim 9, wherein the moist gluten mass is formed into sheets having a thickness of about 0.35 cm or less prior to freezing.

11. A method as defined in claim 9, wherein the moist gluten mass is formed into granules having a size from about of 1 to about 10 mm prior to freezing.

12. A method as defined in claim 8, wherein the moist gluten mass has a moisture content of about 70%.

13. A method of reducing a moist gluten mass into gluten particles comprising:

forming a sheet of moist gluten mass or granules of moist gluten;

freezing the moist gluten until it is less than about −50° C., the freezing effective for generating brittle moist gluten;

subjecting the brittle moist gluten to mechanical force to generate moist gluten particles; and drying the moist gluten particles.

14. A method as defined in claim 13, wherein ice crystals are formed upon freezing of the moist gluten mass.

15. A method as defined in claim 14, wherein the ice crystals are separated from the moist gluten particles before drying.

16. A method as defined in claim 13, wherein the moist gluten mass has a moisture content of about 70%.

* * * * *